(12) United States Patent
Castillo et al.

(10) Patent No.: US 10,830,261 B2
(45) Date of Patent: Nov. 10, 2020

(54) FIBRILLAR STRUCTURES TO REDUCE VISCOUS DRAG ON AERODYNAMIC AND HYDRODYNAMIC WALL SURFACES

(71) Applicants: Texas Tech University System, Lubbock, TX (US); nanoGriptech, Inc., Pittsburgh, PA (US)

(72) Inventors: Luciano Castillo, Lubbock, TX (US); Burak Aksak, Lubbock, TX (US); Metin Sitti, Pittsburgh, PA (US)

(73) Assignees: Texas Tech University System, Lubbock, TX (US); nanoGriptech, Inc., Pittsburgh, PA (US)

( * ) Notice: Subject to any disclaimer, the term of this patent is extended or adjusted under 35 U.S.C. 154(b) by 0 days.

(21) Appl. No.: 14/774,767

(22) PCT Filed: Mar. 12, 2014

(86) PCT No.: PCT/US2014/024409
§ 371 (c)(1),
(2) Date: Sep. 11, 2015

(87) PCT Pub. No.: WO2014/165106
PCT Pub. Date: Oct. 9, 2014

(65) Prior Publication Data
US 2016/0017902 A1    Jan. 21, 2016

Related U.S. Application Data

(60) Provisional application No. 61/777,258, filed on Mar. 12, 2013.

(51) Int. Cl.
*F15D 1/00* (2006.01)
*B64C 21/10* (2006.01)
*B63B 1/36* (2006.01)

(52) U.S. Cl.
CPC ............... *F15D 1/003* (2013.01); *B63B 1/36* (2013.01); *B64C 21/10* (2013.01); *F15D 1/0035* (2013.01);
(Continued)

(58) Field of Classification Search
CPC ....... F15D 1/003; F15D 1/0035; B64C 21/10; B64C 2230/22; B64C 21/00–10;
(Continued)

(56) References Cited

U.S. PATENT DOCUMENTS 3,388,651 A * 6/1968 Axelrod ............... A63H 27/001
156/85
4,706,910 A 11/1987 Walsh et al.
(Continued)

FOREIGN PATENT DOCUMENTS

EP     2010007846       1/2014
KR     10-1986-0008866 A   12/1986

OTHER PUBLICATIONS

"Fiber." Complete Textile Glossary. New York, NY: Celanese Acetate, 2001. N. pag. Print. (Year: 2001).*
(Continued)

*Primary Examiner* — Laura C Powers
*Assistant Examiner* — Larissa Rowe Emrich
(74) *Attorney, Agent, or Firm* — Daniel J. Chalker; Edwin S. Flores; Chalker Flores, LLP

(57) ABSTRACT

An aerodynamic or hydrodynamic wall surface has an array of fibrillar structures disposed on and extending from the wall surface, wherein each fibrillar structure comprises a stalk and a tip. The stalk has a first end and a second end, wherein the first end is attached to the wall surface, and the stalk is oriented with respect to the wall surface at a stalk angle between approximately 1 degrees and 179 degrees. The tip has a first side and a second side, wherein the first
(Continued)

side is attached proximate to the second end of the stalk, the tip has a larger cross-sectional area than the stalk, and the second side comprises a substantially planar surface that is oriented with respect to the stalk at a tip angle between approximately 0 degrees and 90 degrees.

19 Claims, 12 Drawing Sheets

(52) U.S. Cl.
 CPC ......... *B64C 2230/26* (2013.01); *Y02T 50/166* (2013.01); *Y02T 70/121* (2013.01)
(58) Field of Classification Search
 CPC ......... B64C 23/06–076; B64C 2230/26; Y02T 50/166; C09J 2201/626; B63B 1/36
 See application file for complete search history.

(56) References Cited

U.S. PATENT DOCUMENTS

| | | | | |
|---|---|---|---|---|
| 4,736,912 | A * | 4/1988 | Loebert | B63B 1/34 |
| | | | | 114/67 R |
| 5,971,326 | A | 10/1999 | Bechert | |
| 6,872,439 | B2 * | 3/2005 | Fearing | A44B 18/0003 |
| | | | | 24/442 |
| 8,206,631 | B1 * | 6/2012 | Sitti | B29C 39/10 |
| | | | | 264/250 |
| 8,703,032 | B2 * | 4/2014 | Menon | B29C 33/3878 |
| | | | | 216/48 |
| 9,815,261 | B2 * | 11/2017 | Browne | B32B 27/38 |
| 2004/0126541 | A1 | 7/2004 | Dietz et al. | |
| 2005/0163963 | A1 | 7/2005 | Munro et al. | |
| 2010/0127125 | A1 * | 5/2010 | Li | B21B 1/227 |
| | | | | 244/119 |
| 2010/0252177 | A1 * | 10/2010 | Sargent | C09J 7/00 |
| | | | | 156/152 |
| 2011/0073710 | A1 | 3/2011 | Rawlings et al. | |

OTHER PUBLICATIONS

Walsh, Michael J., "Riblets", Jan. 1, 1990, Viscous Drag Reduction in Boundary Layers, American Institute of Aeronautics and Astronautics, pp. 203-261.
EP 14779689.0 Extended European Search Report dated Mar. 21, 2016.
International Search Report and Written Opinion [PCT/US2014/024409] KIPO dated Aug. 1, 2014.
Aksak, B. et al., "Gecko Inspired Micro-fibrillar Adhesives for Wall Climbing Robots on Micro/Nanoscale Rough Surfaces," ICRA, Pasadena, CA, 2008.
Araya, G., et al., "Inlet condition generation for spatially-developing turbulent boundary layers via multi-scale similarity", J. of Turbulence, 10, No. 36, 133, 2009.
Araya, G., et al., "A dynamic multi-scale approach for turbulent inflow boundary conditions in spatially evolving flows", JFM, 670, 518-605, 2011.
Araya, G. et al., "DNS of turbulent thermal boundary layers up to $Re\theta = 2300$", International Journal of Heat and Mass Transfer, vol. 55, Issues 15-16, pp. 4003-4019, Apr. 2012.
Brzek, B. et al., "Transitionally rough zero pressure gradient turbulent boundary layers", Experiments in Fluids, 44, 115-124, 2008.
Cardillo, J. et al., "DNS of a Turbulent Boundary Layer with Surface Roughness", JFM (under review), 2012.
Dean, B.D. et al., "Shark-skin surfaces for fluid-drag reduction in turbulent flow: a review," Phil. Trans. R. Soc. A 368: 4775-4806, 2010.
Murphy, M. et al., "Gecko-Inspired Directional and Controllable Adhesion," Small, 5(2):170-175, 2008.

* cited by examiner

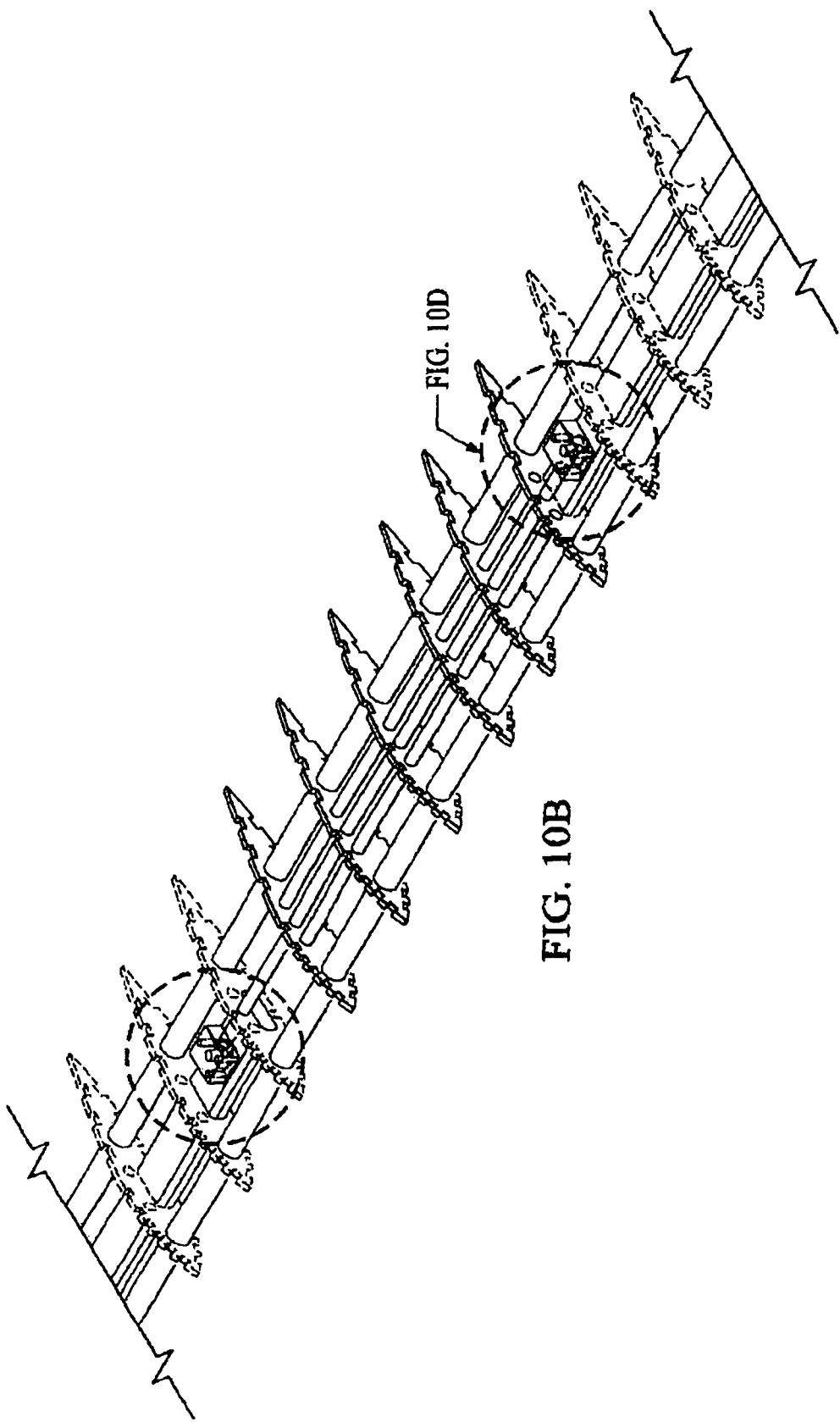

FIBRILLAR STRUCTURES TO REDUCE VISCOUS DRAG ON AERODYNAMIC AND HYDRODYNAMIC WALL SURFACES

CROSS-REFERENCE TO RELATED APPLICATIONS

This application claims priority to, and is a National Stage Patent Application of International Application No. PCT/US2014/024409 filed on Mar. 12, 2014, which claims priority to U.S. Provisional Patent Application Ser. No. 61/777,258, filed on Mar. 12, 2013. The contents of both applications are incorporated by reference herein in their entirety.

FIELD OF INVENTION

The present invention relates generally to the field of aerodynamics and hydrodynamics and, more particularly, to fibrillar structures to reduce viscous drag on aerodynamic and hydrodynamic wall surfaces.

BACKGROUND ART

Micro- and/or nano-fibrillar structures exist in a variety of naturally-occurring biological systems, such as gecko foot pads and lotus leaves, where these patterns promote adhesion and self-cleaning, respectively (Aksak et al. Langmiur 2007). Recent attention has been made on understanding the purpose and effects of such biological micro- and/or nano-structures, as well as methods to fabricate similar synthetic structures using micro/nano-fabrication techniques. For example, there have been many recent studies on shark-skin inspired micro-structures.

Drag reduction on aerodynamic and hydrodynamic surfaces consists of reducing viscous skin friction, delaying flow separation and boundary layer relaminarization by external means. Passive techniques, such as applying surface roughness, riblets, and/or additives, are simple and easy to apply without additional requirement of external power and complicated control schemes. Substantial prior research on the subject has already demonstrated that by manipulating the surface characteristics, i.e. surface roughness, chemistry, and wall compliance, and by altering near wall fluids property like effective viscosity, one can impact the genesis, growth and dissipation of near wall coherent structures which correlate strongly with high wall shear stress events (Sheng et. al, JFM 2008, Hong and Katz, JFM 2012). Recent studies using flow control techniques such as near wall Lorenze force, synthetic jets, and active surfaces aiming at manipulating the buffer layer dynamics and consequently controlling the population of near wall coherent structures, show success in identifying the mechanisms at laboratory scales. Impaired by manufacturing cost and difficulty in scaling to large-scale applications, these techniques have not resulted in widely-adopted commercial products.

One of the methods to increase the efficiency of wind turbines, ground and aerospace transportation systems, wall-bounded flows such as pipe flows (including oil transport in petroleum applications), and under water bodies (e.g. submarines) relies on reducing viscous drag. Free-stream turbulence and turbulence within the boundary layer generated after the flow that comes in contact with a surface result in increased viscous drag. Additional increase in roughness through mosquitos and dust sticking to the surfaces further increase viscous drag and reduce efficiency in wind turbine applications.

Riblets, a shark-skin inspired technology, have been used extensively to reduce drag particularly for airfoils applications. Riblets are micro-grooves on the surface of the airfoil that are in-line with the free stream flow direction. A turbulent boundary layer (i.e. a very thin region near the wall where viscous forces are important) could be hydraulically smooth (i.e. nearly smooth) at low Reynolds numbers, but may become rough at high Reynolds numbers. This is because as the boundary layer becomes thinner with increasing Reynolds number (or speed), the ratio of the roughness height to the viscous length scale becomes very large. Therefore, the outer flow, which is about 90% of the flow, becomes more sensitive to changes in the wall conditions. This is a crucial problem in submarines and ships where the Reynolds number is large and proper value of the skin friction (viscous drag) as a function of the roughness parameter is crucial. Drag reduction of up to 10% has been reported for airfoils with riblets on its surface [1].

As a result, there is a need for a passive technology that results in a drag reduction greater than the 10% reduction observed for riblets on aerodynamic and hydrodynamic wall structures.

SUMMARY OF THE INVENTION

The present invention provides a passive structure that results in a drag reduction greater than the 10% reduction observed for riblets on aerodynamic and hydrodynamic wall structures by modifying the surface of the wall structure with micro-fibers that modify the coherent structures in the inner flow.

More specifically, the present invention provides an aerodynamic or hydrodynamic wall surface having an array of fibrillar structures disposed on and extending from the wall surface, wherein each fibrillar structure comprises a stalk and a tip. The stalk has a first end and a second end, wherein the first end is attached to the wall surface, and the stalk is oriented with respect to the wall surface at a stalk angle between approximately 1 degree and 90 degrees. The tip has a first side and a second side, wherein the first side is attached proximate to the second end of the stalk, the tip has a larger cross-sectional area than the stalk, and the second side comprises a substantially planar surface that is oriented with respect to the stalk at a tip angle between approximately 0 degrees and 90 degrees.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which:

FIGS. 10A, 10B, 10C and 10D are images showing the experimental setup, wing schematic, wing side view and load cell schematic, respectively, in accordance with one embodiment of the present invention.

DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to airfoils, but it will be understood that the concepts of the present invention are applicable to any aerodynamic or hydrodynamic wall surface.

Figure 1A:
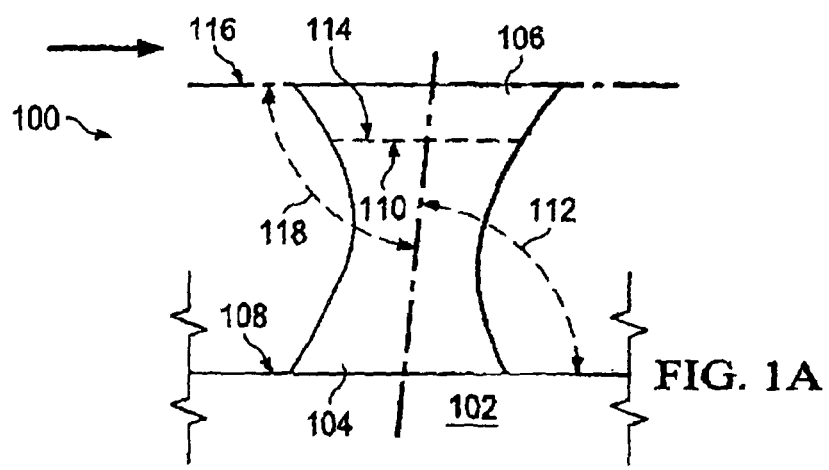
FIG. 1A is a diagram of a fibrillar structure in accordance with one embodiment of the present invention.

Now referring to FIG. 1A, a diagram of a fibrillar structure 100 in accordance with one embodiment of the present invention is shown. The aerodynamic or hydrodynamic wall surface 102 has an array (see FIGS. 1B and 1C) of fibrillar structures 100 disposed on and extending from the wall surface 102. The wall surface 102 can be any shape (e.g., curved) and any portion of wind turbine blade, a propeller, a wing, an airfoil, a flight control surface, a hull of a ship or a submarine, a land-based vehicle, an manned or unmanned aerial vehicle, a pipeline or a stationary structure. Each fibrillar structure 100 has a stalk 104 and a tip 106. The stalk 104 has a first end 108 and a second end 110. The first end 108 of the stalk 104 is attached to the wall surface 102. In addition, the stalk 104 is oriented with respect to the wall surface 102 at a stalk angle 112 between approximately 1 degree and 179 degrees. The tip 106 has a first side 114 and a second side 116. The first side 114 is attached proximate to the second end 110 of the stalk 104. The tip 106 has a larger cross-sectional area than the stalk 104. The second side 116 is a substantially planar surface that is oriented with respect to the stalk 104 at a tip angle 118 between approximately 0 degrees and 90 degrees.

Figure 2A:
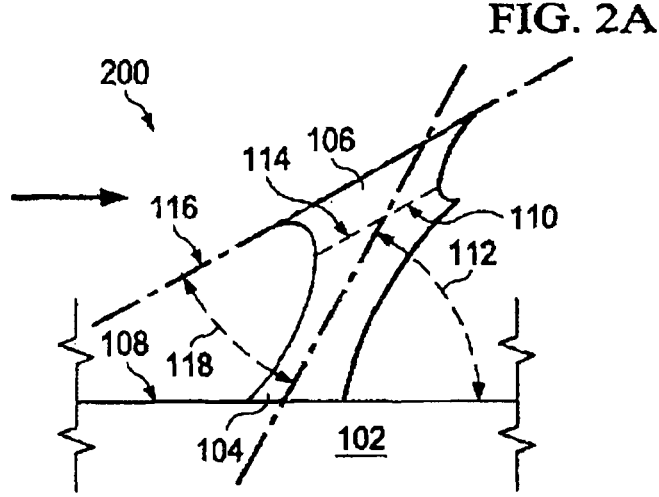
FIG. 2A is a diagram of a fibrillar structure in accordance with another embodiment of the present invention.
Figure 2B:
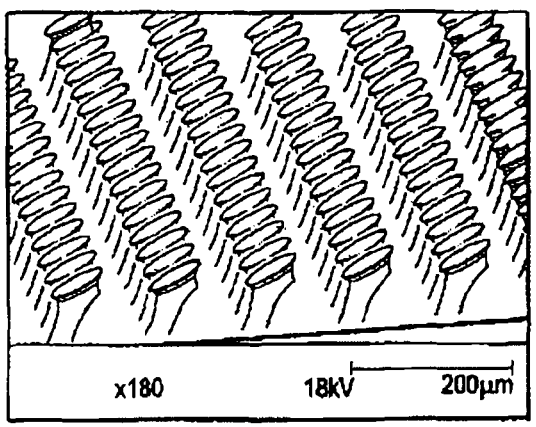
FIGS. 2B, 2C and 2D are artistic renderings of SEM images of an array of the fibrillar structure of FIG. 2A in accordance with another embodiment of the present invention.
Figure 3:
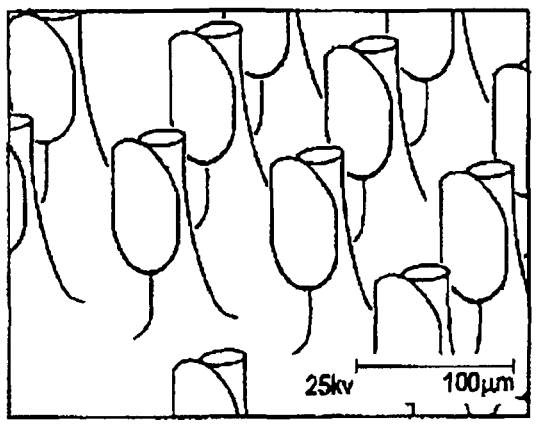
FIG. 3 is an artistic rendering of a SEM image of an array of fibrillar structures in accordance with yet another embodiment of the present invention.
Figure 2C:
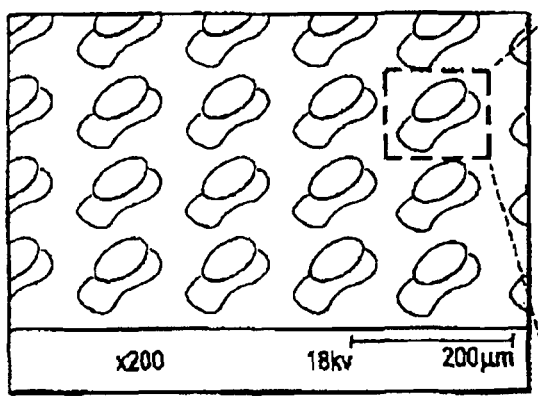
Figure 2D:
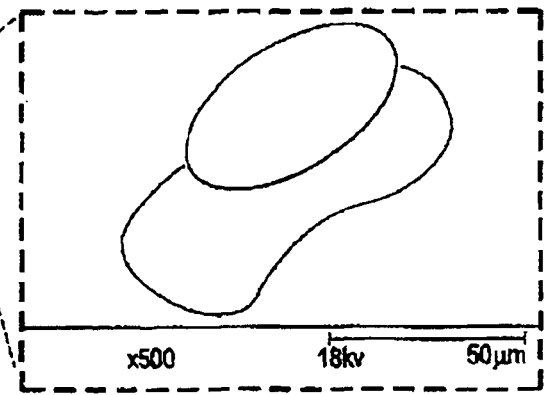

Similarly, FIG. 2A shows a diagram of a fibrillar structure 200 in accordance with one embodiment of the present invention. The aerodynamic or hydrodynamic wall surface 102 has an array (see FIGS. 2B, 2C and 2D) of fibrillar structures 200 disposed on and extending from the wall surface 102. Each fibrillar structure 200 has a stalk 104 and a tip 106. The stalk 104 has a first end 108 and a second end 110. The first end 108 of the stalk 104 is attached to the wall surface 102. In addition, the stalk 104 is oriented with respect to the wall surface 102 at a stalk angle 112 between approximately 1 degree and 179 degrees. The tip 106 has a first side 114 and a second side 116. The first side 114 is attached proximate to the second end 110 of the stalk 104. The tip 106 has a larger cross-sectional area than the stalk 104. The second side 116 is a substantially planar surface that is oriented with respect to the stalk 104 at a tip angle 118 between approximately 0 degrees and 90 degrees.

A cross section of the stalk 104 can be substantially square shaped, rectangular shaped, circular shaped, elliptically shaped, triangular shaped, hexagonally shaped, multi-sided prism shaped or any other desired shape. Likewise, the second side 116 of the tip 106 can be substantially square shaped, rectangular shaped, circular shaped, elliptically shaped, triangular shaped, hexagonally shaped, multi-sided prism shaped or any other desired shape. The stalk 104 and tip 106 can be formed from a single material. Likewise, the wall surface 102, each stalk 104 and each tip 106 can be formed from a single material, such as a silicone rubber, a polyurethane plastic, a thermoplastic, a thermoset, a UV curable material, a polymer or a combination thereof. In addition, the stalk 104 and/or tip 106 can be textured, grooved, ribbed, ridged or otherwise configured to achieve the desired results.

The fibrillar structures 100 and 200 add a controlled, periodic roughness to the surface 102 of airfoils and underwater bodies. The arrays of fibrillar structures 100 and 200 (stalks 104 and tips 106) are manufactured from templates, which are produced utilizing micro/nano-fabrication techniques like photolithography and/or etching processes. These templates are then micro/nano-molded to form the fibrillar structure 100 and 200 geometry. These geometries 100 and 200 reduce turbulence and viscous drag in a more effective fashion than micro-riblets. (see FIGS. 1B, 1C, 2B, 2C and 2D).

The developed fabrication technique allows for control over the diameter (10 nm and up), length (10 nm and up), cross-sections (including but not limited to square, rectangle, circle, ellipse, triangle, hexagon, multi-sided prism or any other desired shape) and fiber spacing (10 nm and up, square, hexagonal, random or other packing configuration) as seen in FIGS. 1B, 1C, 2B, 2C, 2D and 3. In addition, the alignment of the stalk 104 and the tip 106 can be controlled separately from 0° to 90° (most often 0° to 45°) which aids in creating surfaces with directional drag properties. For example, each stalk may have a stalk diameter of approximately 10 nm to 1000 μm, a length of approximately 10 nm to 1000 μm, each tip may have a tip diameter of approximately 10 nm to 2000 μm, and a center of each stalk is separated from a center of an adjacent stalk by approximately 10 nm to 5000 μm. In addition, multiple arrays of fibrillar structures having one or more of a different stalk angle, a different stalk shape, a different stalk length, a different stalk diameter, a different tip angle, a different tip shape, a different tip length, a different tip diameter, a different spacing, a different packing configuration or a different backing layer thickness can be used on a single surface.

Moreover, it is possible to create fiber arrays with heterogeneous fiber geometry such that the individual fibers forming the array have varying cross-sectional shape, diameter, and spacing. This tuning ability could provide optimal performance for transitional flows. This technology relies on a micromolding process and uses readily available commercial materials. In one embodiment of the invention, polyurethane plastics can be used to form the microfiber structures. In another embodiment of the invention, silicone rubbers can be used to form the microfiber structures. In other embodiments of the invention, any moldable material compatible with the manufacturing process can be used to form the micro- and/or nano-patterned aerodynamic/hydrodynamic surface, including, but not limited to:

A. Thermosets:
  i. Formaldehyde Resins (PF, RF, CF, XF, FF, MF, UF, MUF);
  ii. Polyurethanes (PU);
  iii. Unsaturated Polyester Resins (UP);
  iv. Vinylester Resins (VE), Phenacrylate Resins, Vinylester Urethanes (VU);
  v. Epoxy Resins (EP);
  vi. Diallyl Phthalate Resins, Allyl Esters (PDAP);
  vii. Silicone Resins (Si); and
  viii. Rubbers: R-Rubbers (NR, IR, BR, CR, SBR, NBR, NCR, IIR, PNR, SIR, TOR, HNBR), M-Rubbers (EPM, EPDM, AECM, EAM, CSM, CM, ACM, ABM, ANM, FKM, FPM, FFKM), O-Rubbers (CO, ECO, ETER, PO), Q-(Silicone) Rubber (MQ, MPQ, MVQ, PVMQ, MFQ, MVFQ), T-Rubber (TM, ET, TCF), U-Rubbers (AFMU, EU, AU) Text, and Polyphosphazenes (PNF, FZ, PZ)

B. Thermoplastics
  i. Polyolefins (PO), Polyolefin Derivates, and Copolymers: Standard Polyethylene Homo- and Copolymers (PE-LD, PE-HD, PE-HD-HMW, PE-HD-UHMW, PE-LLD), Polyethylene Derivates (PE-X, PE+PSAC), Chlorinated and Chloro-Sulfonated PE (PE-C, CSM), Ethylene Copolymers (ULDPE, EVAC, EVAL, EEAK, EB, EBA, EMA, EAA, E/P, EIM, COC, ECB, ETFE, Polypropylene Homopolymers (PP, H-PP);
  ii. Polypropylene Copolymers and -Derivates, Blends (PP-C, PP-B, EPDM, PP+EPDM);
  iii. Polybutene (PB, PIB);
  iv. Higher Poly-α-Olefins (PMP, PDCPD);
  v. Styrene Polymers: Polystyrene, Homopolymers (PS, PMS), Polystyrene,
  Copoplymers, Blends, Polystyrene Foams (PS-E, XPS);
  vi. Vinyl Polymers: Rigid Polyvinylchloride Homopolymers (PVC-U), Plasticized (Soft) Polyvinylchloride (PVC-P), Polyvinylchloride: Copolymers and Blends, Polyvinylchloride: Pastes, Plastisols, Organosols, Vinyl Polymers, other Homo- and Copolymers (PVDC, PVAC, PVAL, PVME, PVB, PVK, PVP);
  vii. Fluoropolymers: FluoroHomopolymers (PTFE, PVDF, PVF, PCTFE), Fluoro Copolymers and Elastomers (ECTFE, ETFE, FEP, TFEP, PFA, PTFEAF, TFE-HFPVDF (THV), [FKM, FPM, FFKM]);
  viii. Polyacryl- and Methacryl Copolymers;
  ix. Polyacrylate, Homo- and Copolymers (PAA, PAN, PMA, ANBA, ANMA);
  x. Polymethacrylates, Homo- and Copolymers (PMMA, AMMA, MABS, MBS);
  xii. Polymethacrylate, Modifications and Blends (PMMI, PMMA-HI, MMA-EML Copolymers), PMMA+ABS Blends;
  xii. Polyoxymethylene, Polyacetal Resins, Polyformaldehyde (POM): Polyoxymethylene Homo- and Copolymers (POM-H, POM-Cop.), Polyoxymethylene, Modifications and Blends (POM+PUR);
  xiii. Polyamides (PA): Polyamide Homopolymers (AB and AA/BB Polymers) (PA6, 11, 12, 46, 66, 69, 610, 612, PA 7, 8, 9, 1313, 613), Polyamide Copolymers, PA 66/6, PA 6/12, PA 66/6/610 Blends (PA +: ABS, EPDM, EVA, PPS, PPE, Rubber), Polyamides, Special Polymers (PA NDT/INDT [PA 6-3-t], PAPACM 12, PA 6-I, PA MXD6 [PARA], PA 6-T, PA PDA-T, PA 6-6-T, PA 6-G, PA 12-G, TPA-EE), Cast Polyamides (PA 6-C, PA 12-C), Polyamide for Reaction Injection Molding (PA-RIM), Aromatic Polyamides, Aramides (PMPI, PPTA);
  xiv. Aromatic (Saturated) Polyesters: Polycarbonate (PC), Polyesters of Therephthalic Acids, Blends, Block Copolymers, Polyesters of Aromatic Diols and Carboxylic Acids (PAR, PBN, PEN);
  xv. Aromatic Polysulfides and Polysulfones (PPS, PSU, PES, PPSU, PSU+ABS): Polyphenylene Sulfide (PPS), Polyarylsulfone (PSU, PSU+ABS, PES, PPSU);
  xvi. Aromatic Polyether, Polyphenylene Ether (PPE), and PPE Blends;
  xvii. Aliphatic Polyester (Polyglycols) (PEOX, PPDX, PTHF);
  xviii. Aromatic Polyimide (PI): Thermosetting Polyimide (PI, PBMI, PBI, PBO, and others), Thermoplastic Polyimides (PAI, PEI, PISO, PMI, PMMI, PESI, PARI);
  xix. Liquid Crystalline Polymers (LCP);
  xx. Ladder Polymers: Two-Dimensional Polyaromates and —Heterocyclenes: Linear Polyarylenes, Poly-p-Xylylenes (Parylenes), Poly-p-Hydroxybenzoate (Ekonol), Polyimidazopyrrolone, Pyrone, Polycyclone;
  xxi. Biopolymers, Naturally Occurring Polymers and Derivates: Cellulose- and Starch Derivates (CA, CTA, CAP, CAB, CN, EC, MC, CMC, CH, VF, PSAC), 2 Casein Polymers, Casein Formaldehyde, Artificial Horn (CS, CSF), Polylactide, Polylactic Acid (PLA), Polytriglyceride Resins (PTP®);
  xxii. Photodegradable, Biodegradable, and Water Soluble Polymers;
  xxiii. Conductive/Luminescent Polymers;
  xxiv. Aliphatic Polyketones (PK);
  xxv. Polymer Ceramics, Polysilicooxoaluminate (PSIOA);
  xxvi. Thermoplastic Elastomers (TPE): Copolyamides (TPA), Copolyester (TPC), Polyolefin Elastomers (TPO), Polystyrene Thermoplastic Elastomers (TPS), Polyurethane Elastomers (TPU), Polyolefin Blends with Crosslinked Rubber (TPV), and Other TPE, TPZ; and
  xxvii. Other materials known to those familiar with the art.

This flexibility in material selection facilitates the choice of material not only for optimizing the drag reduction but also for meeting the demanding structural or environmental requirements for a wide range of specific commercial applications. The low commodity cost of these moldable materials, the inexpensive manufacturing processes which can produce the micro- and/or nano-patterned arrays in large volumes at high speeds, and the scalability of the fabrication technique make this technology commercially viable. Areas of viscous drag reducing microfibers can be made through molding processes including vacuum-assisted manual or automated batch or continuous roller-based processes. Other molding processes which may be used to produce these microfibers include, but are not limited to:

A. Injection molding: Injection over molding, Co-injection molding, Gas assist injection molding, Tandem injection molding, Ram injection molding, Micro-injection molding, Vibration assisted molding, Multiline molding, Counter flow molding, Gas counter flow molding, Melt counter flow molding, Structural foam molding, Injection-compression molding, Oscillatory molding of optical compact disks, Continuous injection molding, Reaction injection molding (Liquid injection molding, Soluble core molding, Insert molding), and Vacuum Molding;

B. Compression molding: Transfer molding, and Insert molding;

C. Thermoforming: Pressure forming, Laminated sheet forming, Twin sheet thermoforming, and Interdigitation;

D. Casting: Encapsulation, Potting, and impregnation;

E. Coating Processes: Spray coating, Powder coatings, Vacuum coatings, Microencapsulation coatings, Electrode position coatings, Floc coatings, and Dip coating;

F. Blow molding: Injection blow molding, Stretch blow molding, and Extrusion blow molding;

G. Vinyl Dispersions: Dip molding, Dip coatings, Slush molding, Spray coatings, Screened inks, and Hot melts;

H. Composite manufacturing techniques involving molds: Autoclave processing, Bag molding, Hand lay up, and Matched metal compression; and I. Other processes known to those familiar with the art.

Figure 4:
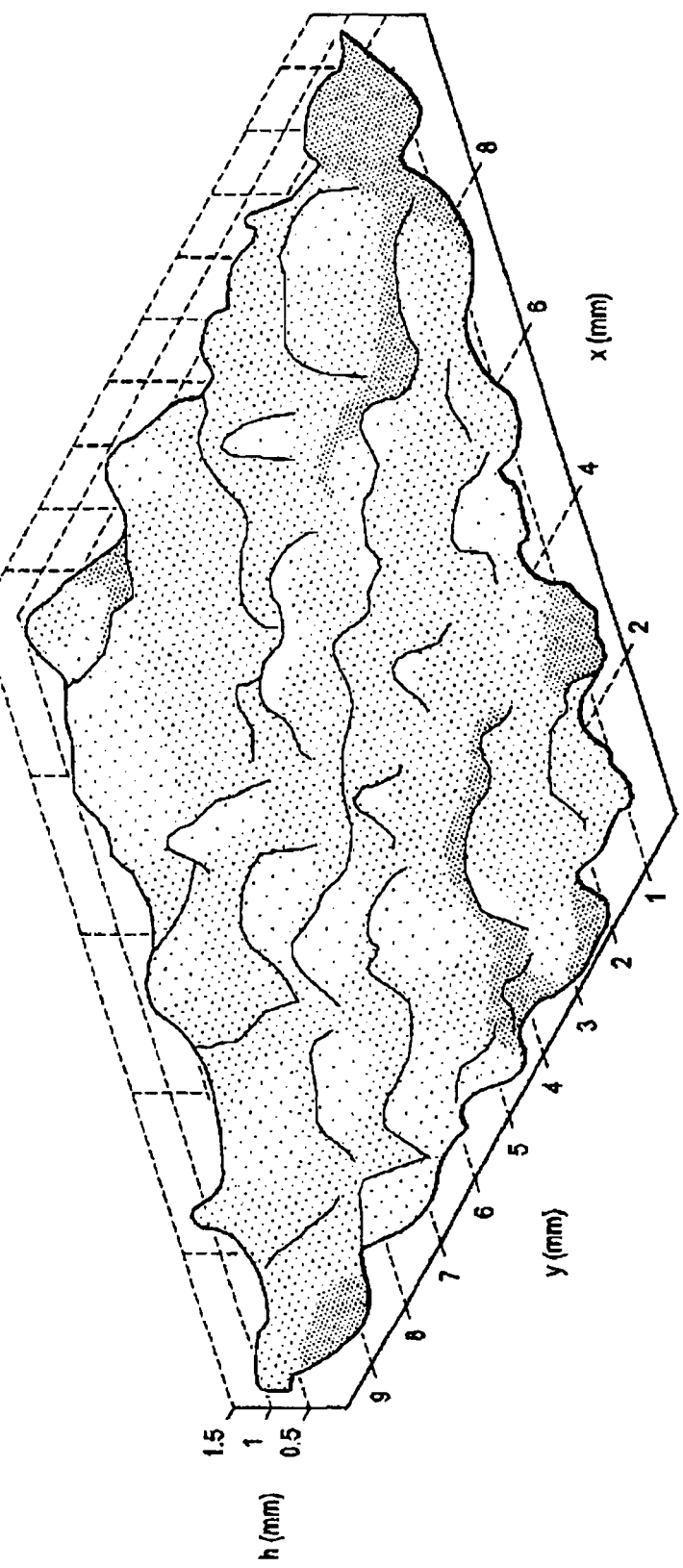
FIG. 4 is a graph showing a roughness height distribution of a sand paper type in accordance with one embodiment of the present invention.
Figure 5:
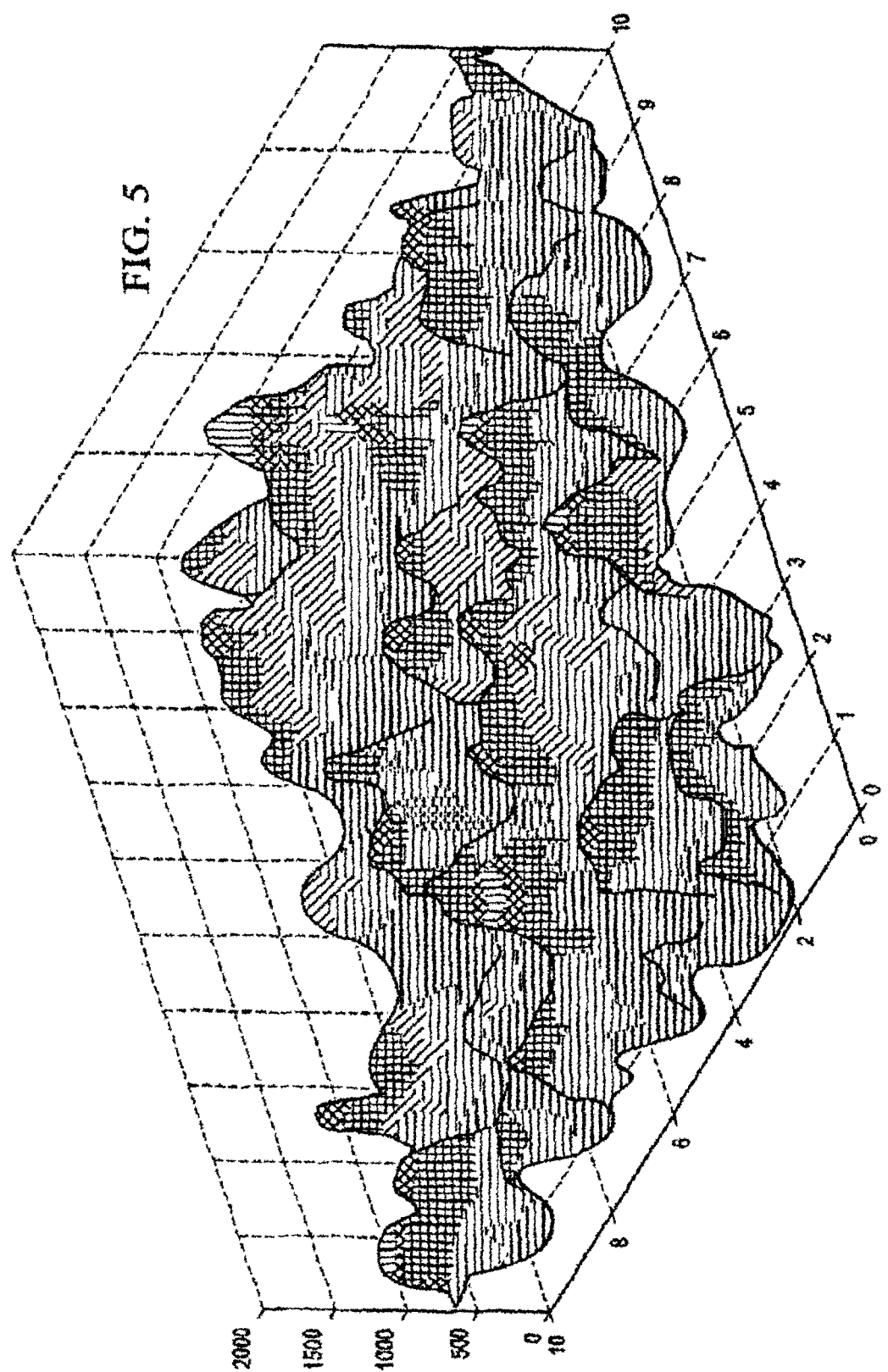
FIG. 5 is a graph showing a roughness height distribution in the mesh in accordance with another embodiment of the present invention.
Figure 6:
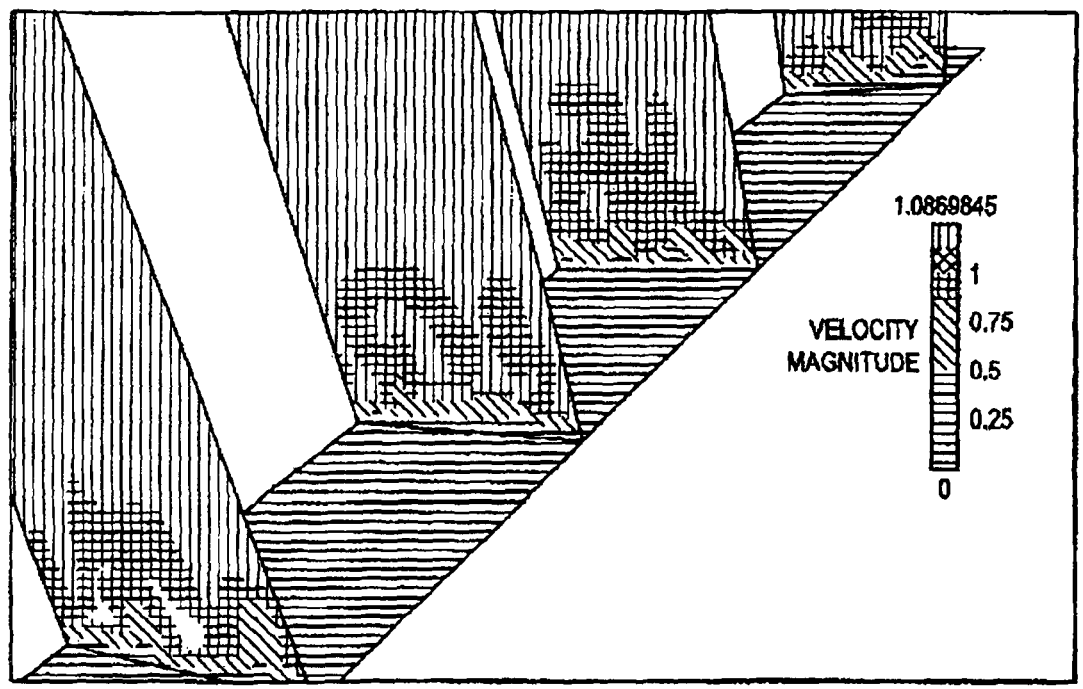
FIG. 6 is an image showing the iso-contours of instantaneous velocity in accordance another embodiment of the present invention.
Figure 7A:
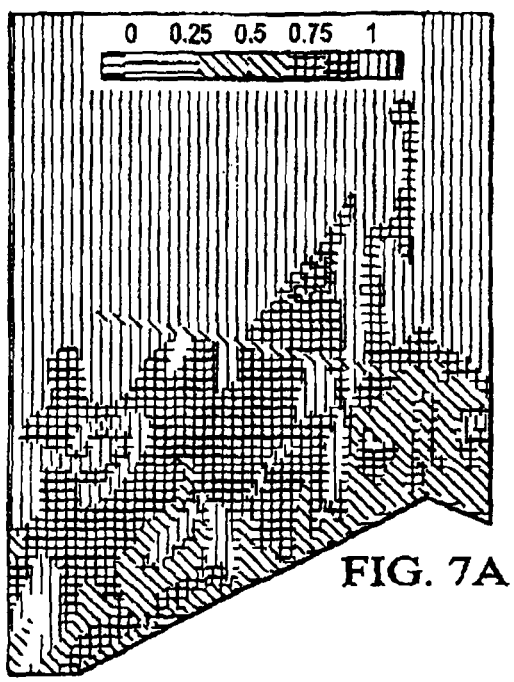
FIGS. 7A and 7B are images showing the iso-contours of instantaneous temperature in smooth surface and a rough surface respectively in accordance with another embodiment of the present invention.
Figure 7B:
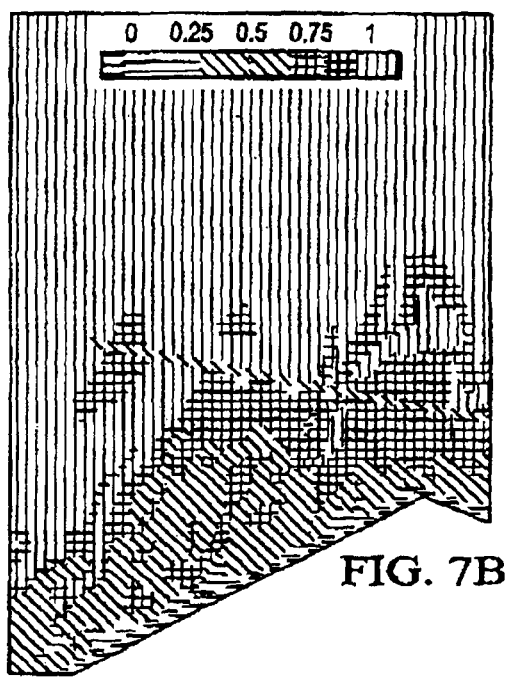

For the numerical investigation, Direct Numerical Simulations (DNS) of turbulent spatially-developing boundary layers under fibrillar surfaces are performed and compared to experimental results of the airfoil in the wind tunnel. The turbulent inflow information is generated based on the dynamic multi-scale approach proposed by Araya et al. [4-6] plus a new methodology for mapping high-resolution topographical surface data into the computational mesh. A major advantage of the dynamic multi-scale procedure is that drastically reduces the length of the computational domain; therefore, higher Reynolds numbers can be computed. The numerical code for performing direct numerical simulations of the full Navier-Stokes equations for incompressible flows is known as PHASTA (Parallel Hierarchic Adaptive Stabilized Transient Analysis). PHASTA is based on the Finite Element method with a Streamline Upwind Petrov-Galerkin (SUPG) stabilization. In order to characterize the surface roughness, a new subroutine has been added to the PHASTA code. The subroutine employs a "displaced-boundary" method. It works by taking the no-slip condition, which is originally assigned to the bottom wall of the computational domain, and displacing it to the height of the roughness element at the corresponding node. An application of the developed displaced-boundary method [7] is shown in FIGS. 4 and 5 for a topographical data of a surface 24-grit sand grain surface taken from experiments by [8]. FIG. 6 depicts iso-contours of instantaneous velocity in a rough surface, a clear thickening of the turbulent boundary layer can be observed due to the presence of roughness. In FIGS. 7A and 7B, iso-contours of instantaneous temperature in smooth and rough surfaces can be observed. The main effect of rough walls on the thermal field has been identified as a mixing enhancement.

Figure 1B:
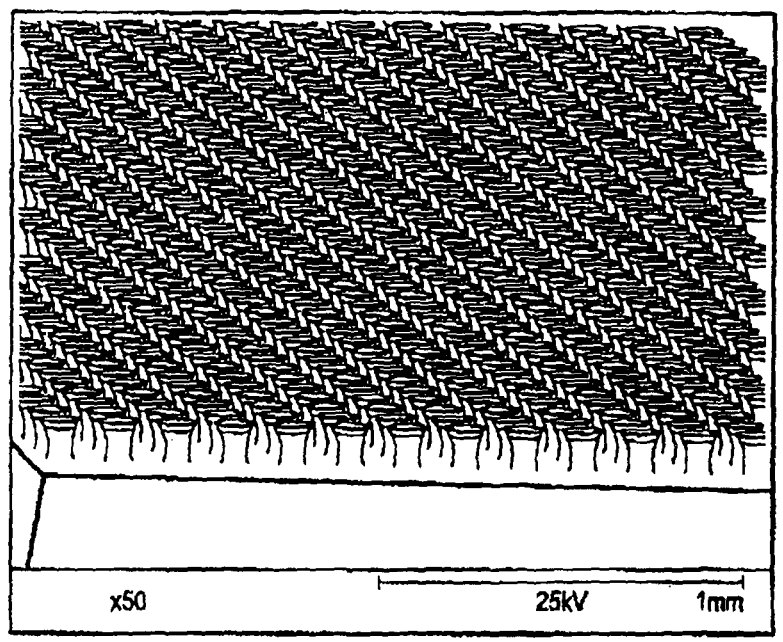
FIGS. 1B and 1C are artistic renderings of scanning electron microscope (SEM) images of an array of the fibrillar structures of FIG. 1A in accordance with one embodiment of the present invention.
Figure 1C:
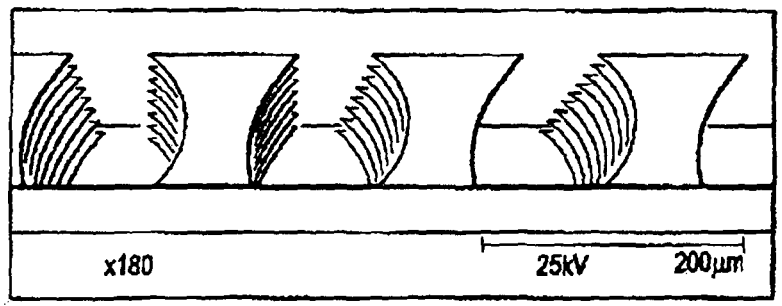
Figure 8A:
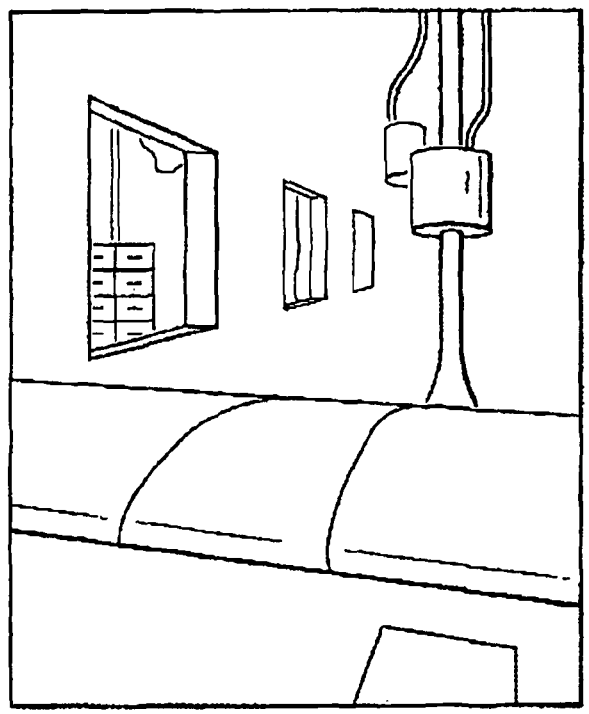
FIGS. 8A and 8B are images of an airfoil with microfibers in a wind tunnel and a fabrication of S089, respectively, in accordance with one embodiment of the present invention.
Figure 8B:
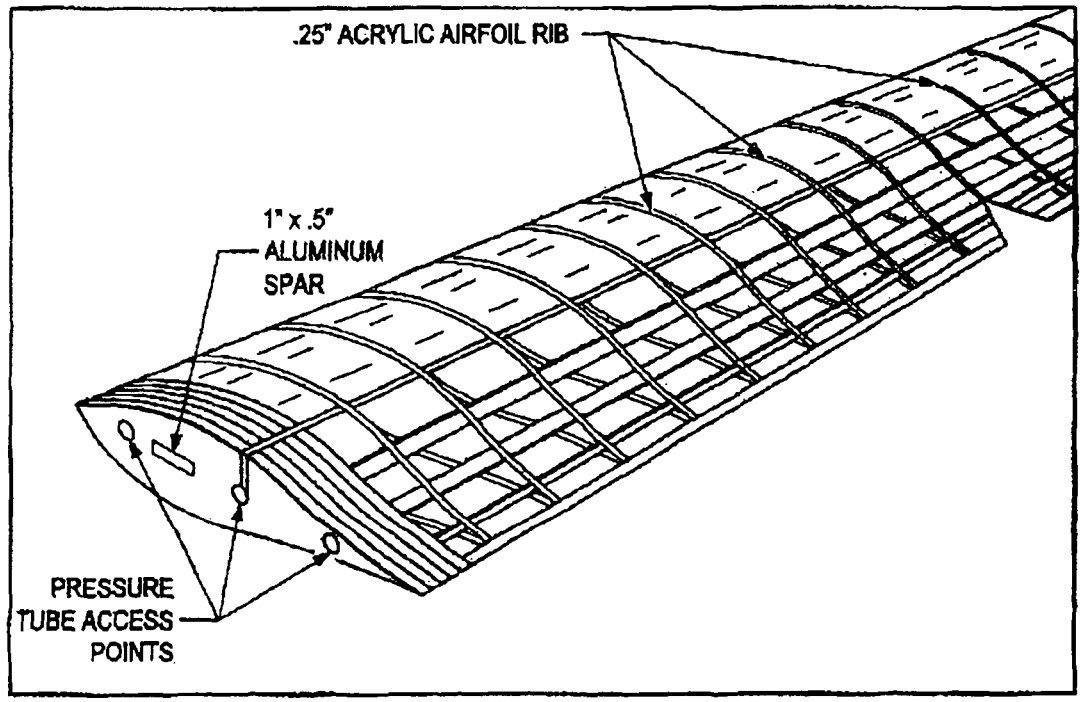
Figure 9A:
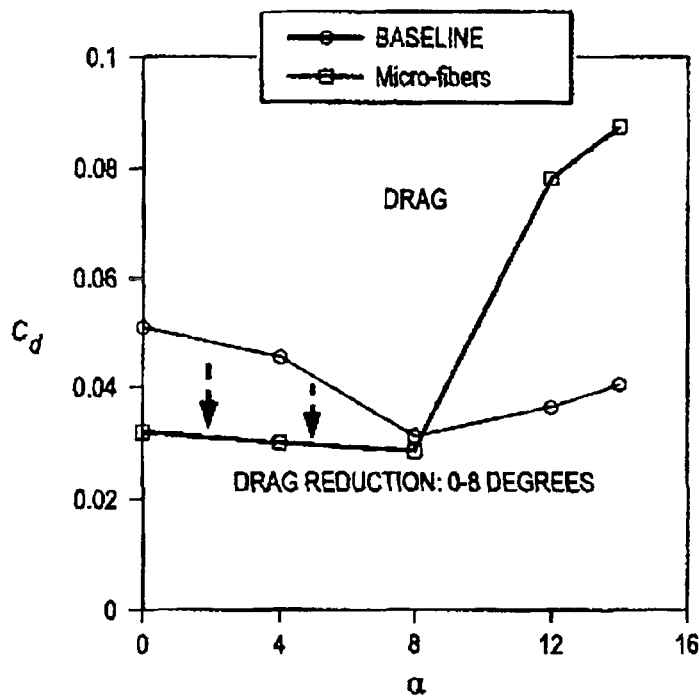
FIGS. 9A and 9B are graphs showing the drag coefficient and velocity deficient, respectively, in accordance with one embodiment of the present invention.
Figure 9B:
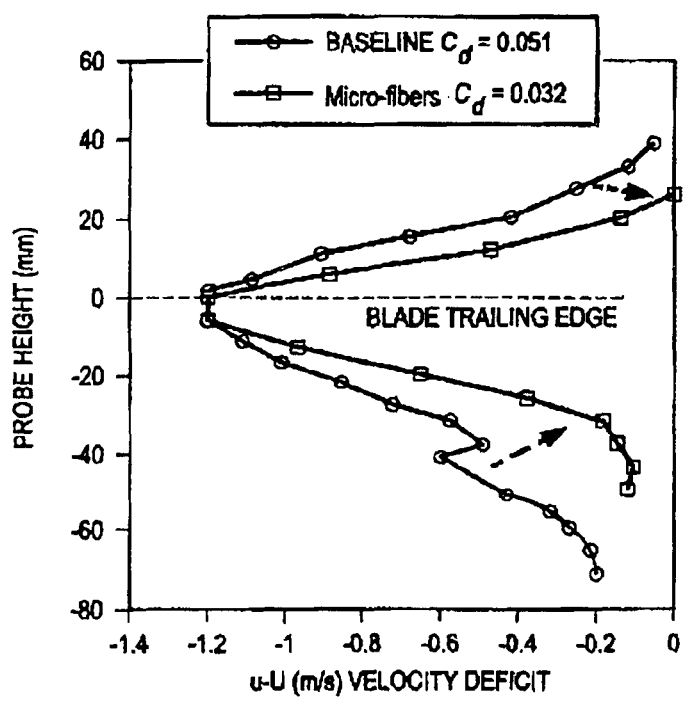

To measure the effect of the fibrillar structures on aerodynamic properties, wind tunnel experiments using pressure tap and wake measurements were performed in a wind tunnel by covering an airfoil surface with the same bio-inspired fibrillar film illustrated in FIG. 1B. Schematics of the airfoil setup are shown in FIGS. 8A and 8B. The dimensions of individual fibers in the studied array are 50 µm in stalk diameter, 100 µm in length, 100 µm in tip diameter. Also the fibers were arranged in a square packing formation where the distance between the centers of neighboring fibers is 120 µm. Notice from FIG. 8A that only the centerline of the airfoil was covered with the film. Results obtained by wake measurements and pressure tap measurements suggest significant drag reduction. A drag reduction up to 38% was observed at 4-degree angle of attack (see FIG. 9A). The velocity deficit in the wake was measured for the baseline (un-treated surface) and for the micro-fibers surface as depicted in FIG. 9B. To the best of the inventors' knowledge, these values are the highest obtained among passive systems used for drag reduction.

To validate and expand upon these results, direct measurements of lift and drag using a dual-cell force balance were also performed to measure lift and drag forces directly using a larger airfoil covered entirely with the same micro fibrillar film (shown in FIG. 1B) used in the pressure experiments of FIGS. 8A and 8B. The experiments were conducted in a zero pressure gradient wind tunnel with a cross-section of 1.75 m×1.25 m. The turbulent intensity during this study was characterized at 1%. Measurements were conducted at six free-stream velocities, 2.5, 5, 7.5, 10, 15 and 20 m/s. Fort each flow condition, lift and drag were measured at 26 angles of attack ranging from −4° to 20° at increments of 1°. Substantial data has been collected to assess drag reduction and aerodynamic performance of baseline case and wing covered with microfilm.

Figure 10A:
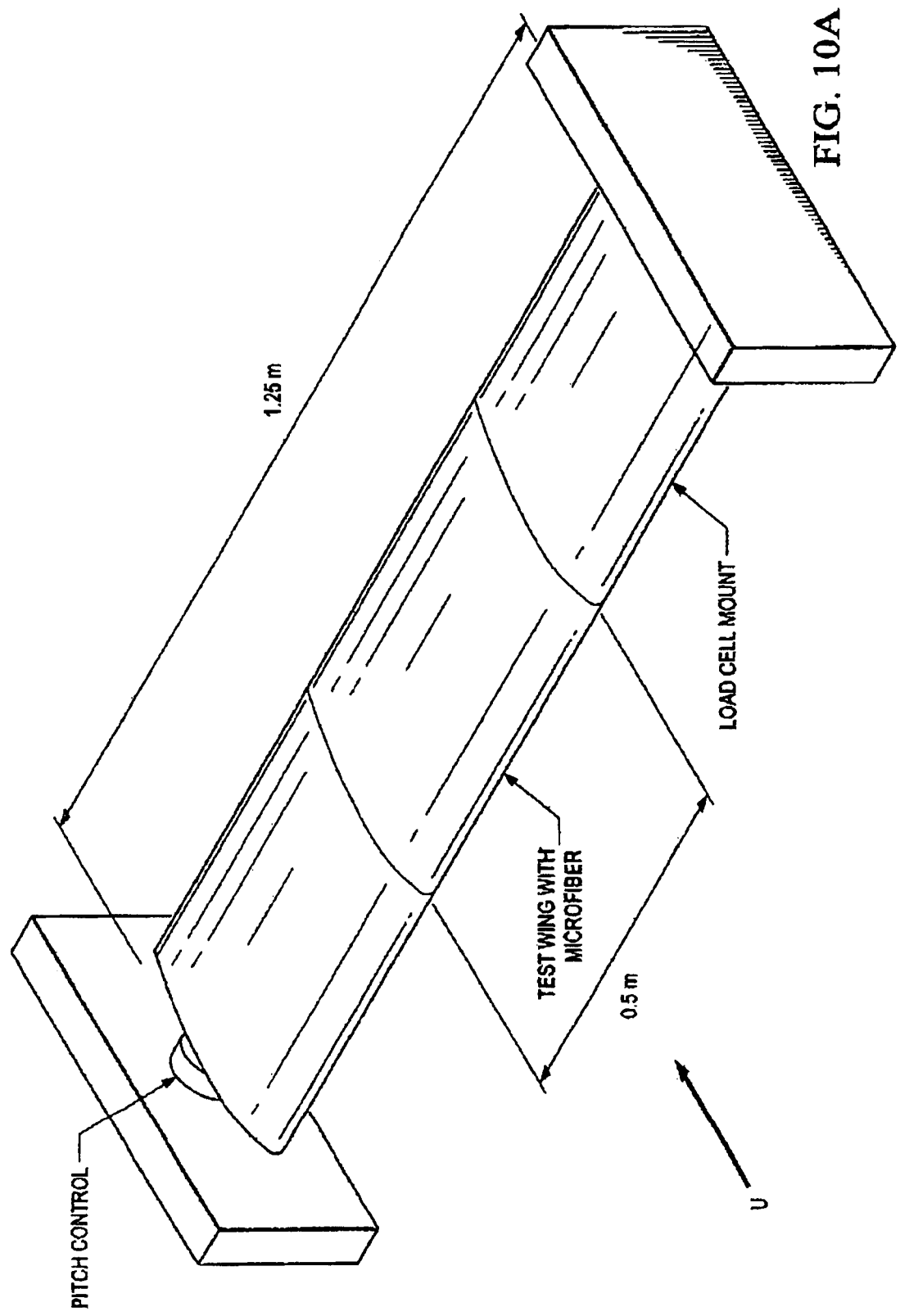
Figure 10D:
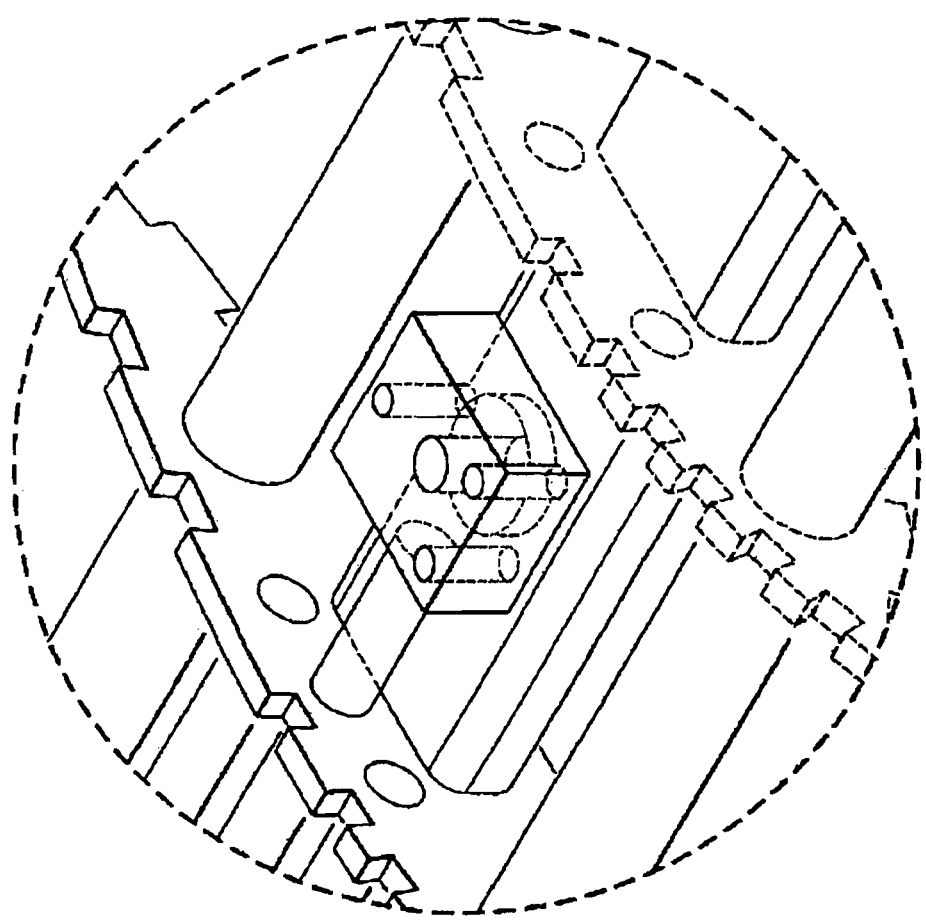
Figure 10C:
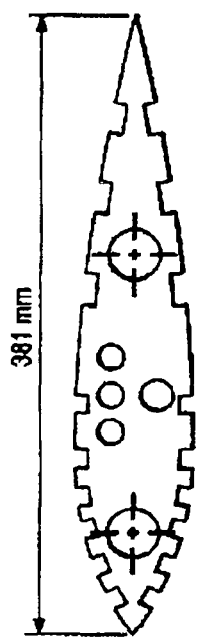

For this set of experiments, a new airfoil with a total wing span of 1.75 m and a cord length of 0.381 m was fabricated which consists of three sections (FIGS. 10A, 10B and 10C): two stationary sections with span of 0.62 m hosting two 6-axis load cell (Mini 40, ATI), and a center test section with a span of 0.5 m. Two load cells are mechanically grounded on two stainless steel rods (with diameters of 1") (see FIG. 10D). This unique dual-load cell design was chosen to improve measurement accuracy and to eliminate the "ghost" forces often associated with the single-cell sting mount balance system. The newly built force balance has been calibrated by performing drag and lift on a smooth cylinder. The drag coefficient is measured at 0.972 and lift force around 0.02N. With careful error analysis, the error in force measurement is ~0.02N or ~0.5% of full scale. Two surfaces have been tested, i.e. a smooth polyurethane surface as the baseline and surface "coated" with microfilm with 50 µm (top)×100 µm (height) micro-fibrillar structure shown in FIG. 1B. Note that the entire test section has been "coated" with the microfilm (white sheet in FIG. 10A). This demonstrates that the manufacturing capability to produce micro-fiber arrays has reached large application scale.

Figure 11A:
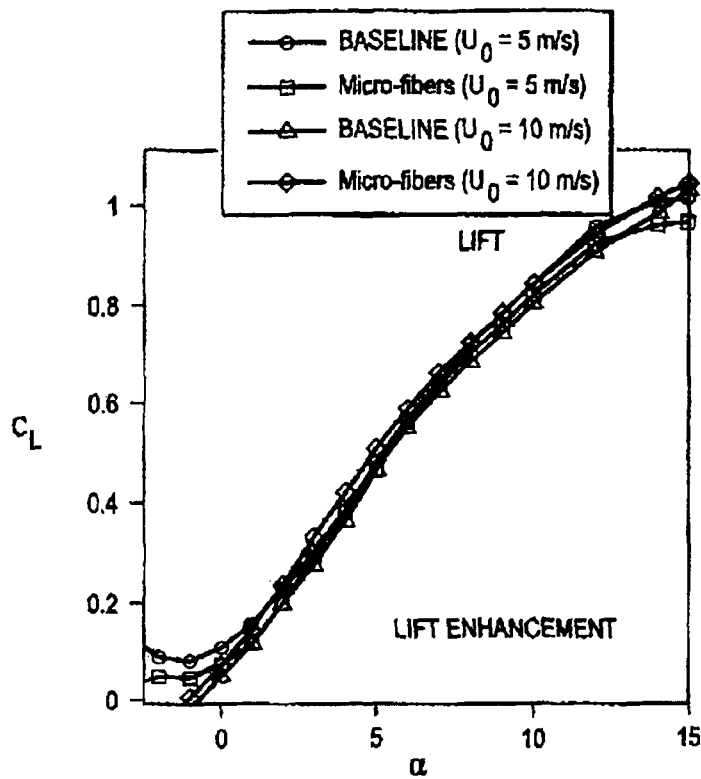
FIGS. 11A, 11B and 11C are graphs showing the lift enhancement, drag reduction lift to drag coefficient in accordance with one embodiment of the present invention.
Figure 11B:
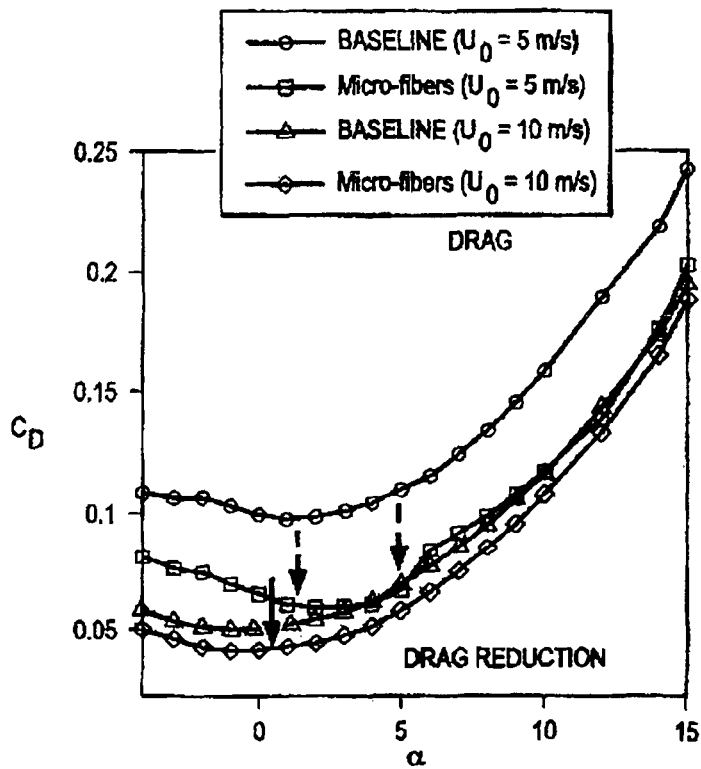
Figure 11C:
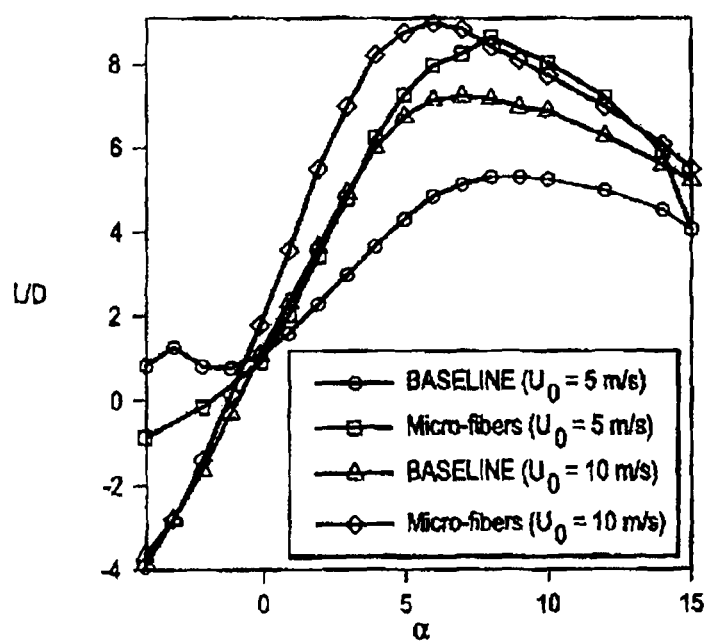

A shown in FIGS. 11A, 11B and 11C, the micro-fibrillar surface provides 40% and 33% of drag reduction at 5 m/s ($Re_c = \frac{uoc}{v}$ based on cord length is $2\times10^5$) and 10 m/s ($Re_c = 4\times10^5$), respectively. The wing has a span of 0.5 m and cord of 0.381 m. The symbols indicate baseline and airfoil with micro-fibers as circle and square respectively. The color represents measurements taken at various free stream velocities (Red=5 m/s; Green=10 m/s). The rate of reduction decreases with increasing Re (not shown). It may suggest that increasing surface roughness as boundary transition to turbulence. It is also noted that the rate increases initially as angles of attack increases and peaks at ~4 after which the rate decreases monotonically. The microfilm surface also impacts the lift generation although the effect is much less pronounced. One can observed that the lift increases with micro-fibers at 5 m/s while it decreases slightly for 10 m/s free stream velocity. In addition, lift-to-dag ratio (L/D) is enhanced with micro-fiber coated airfoil for all speeds and angles of attack higher than 0 degrees. The L/D shows improvement for all Re(s) at angle of attack of 0 and above. Drag reduction with the micro-fiber coated airfoil is similar and hovers around 30%-40% for both the force balance and wake/surface pressure experiments. This match provides added confidence on the data and the groundbreaking nature of this technology and its potential application for drag reduction for aerodynamic and hydrodynamic applications.

Results obtained both by the wake/surface pressure measurement experiment and the force balance measurement experiment show significant drag reduction for the micro-fiber coated airfoil when compared with the uncoated airfoil data. The implications of this technology are groundbreaking in that it improves efficiency significantly leading to higher conversion efficiencies in wind turbines, drastic reduction in fuel consumption in ground and aerospace transportation systems with potential applications in underwater systems. Moreover, this technology can be used in other applications. For example, many additives, which are expensive and pollutants, are added to fracking fluids to reduce the pipeline fluid friction. This technology can both eliminate these additives and achieve greater drag reduction. In another example, this technology can reduce the loading on wind-contacting stationary surfaces (e.g., bridges, construction cranes, etc.), thereby increasing their lifespan and reducing maintenance expenses. Accordingly, this technology can be applied to many different applications, including but not limited to: wind turbines, automobiles, trucking, civilian and military manned aerospace, civilian and military unmanned aerial vehicles (UAVs), other ground transportation (e.g., trains, etc.), other aerospace transportation, civilian an military ship and submarine hulls, pipelines (e.g., oil, gas, fracking, water, etc.), and wind contacting surfaces where minimal loading is important (e.g., bridges, buildings, construction cranes, etc.).

It will be understood by those of skill in the art that although preferred embodiments of the present invention have been described in detail, it will be understood by those skilled in the art that various modifications can be made therein without departing from the spirit and scope of the invention as set forth in the appended claims.

REFERENCES

[1] B. D. Dean, and B. Bhushan, "Shark-skin surfaces for fluid-drag reduction in turbulent flow: a review," *Phil. Trans. R. Soc. A* 368: 4775-4806, 2010.

[2] B. Aksak, M. Murphy, and M. Sitti, "Gecko Inspired Micro-fibrillar Adhesives for Wall Climbing Robots on Micro/Nanoscale Rough Surfaces," *ICRA*, Pasadena, Calif., 2008.

[3] M. Murphy, B. Aksak, and M. Sitti, "Gecko-Inspired Directional and Controllable Adhesion," *Small*, 5(2):170-175, 2008.

[4] Araya, G., Jansen, K. and Castillo, L., "Inlet condition generation for spatially-developing turbulent boundary layers via multi-scale similarity", *J. of Turbulence*, 10, No. 36, 133, 2009.

[5] Araya, G., Castillo, L., Meneveau, C. and Jansen, K., "A dynamic multi-scale approach for turbulent inflow boundary conditions in spatially evolving flows", *JFM*, 670, 518605, 2011.

[6] Araya, G. and Castillo, L., "DNS of turbulent thermal boundary layers up to $Re_\theta=2300$", *International Journal of Heat and Mass Transfer*, Volume 55, Issues 15-16, pp 4003-4019, 2012.

[7] J. Cardillo, Y Chen, G. Araya, O. Sahni, K. Jansen, and L. Castillo, "DNS of a Turbulent Boundary Layer with Surface Roughness", *JFM* (under review), 2012.

[8] B. Brzek and R. B. Cal and G. Johansson and L. Castillo, "Transitionally rough zero pressure gradient turbulent boundary layers", *Experiments in Fluids*, 44, 115124, 2008.

The invention claimed is:

1. An aerodynamic or hydrodynamic wall surface comprising:
   the aerodynamic or hydrodynamic wall surface comprises at least a portion of wind turbine blade, a propeller, a wing, an airfoil, a flight control surface, a hull of a ship or a submarine, a land-based vehicle, an manned or unmanned aerial vehicle or a pipeline;
   an array of spaced-apart individual fibers attached to and extending from the aerodynamic or hydrodynamic wall surface, wherein each individual fiber comprises a stalk and a tip made of a single moldable material;
   each stalk having a first end and a second end, wherein the first end is attached to the aerodynamic or hydrodynamic wall surface, and the stalk is oriented with respect to the aerodynamic or hydrodynamic wall surface at a stalk angle between approximately 1 degree and 179 degrees, each stalk has a stalk diameter of approximately 10 nm to 1000 µm, and a length of approximately 10 nm to 1000 µm, and a center of each stalk is separated from a center of an adjacent stalk by approximately 10 nm to 5000 µm;
   each tip having a first side and a second side, wherein the first side is attached proximate to the second end of the stalk, the tip has a larger cross-sectional area than the stalk, and the second side comprises a substantially planar surface that is oriented with respect to the stalk at a tip angle between approximately 0 degrees and 90 degrees, and each tip has a tip diameter of approximately 10 nm to 2000 µm; and
   wherein the array of spaced-apart individual fibers reduce a drag of the aerodynamic or hydrodynamic wall surface by at least 30%.

2. The wall surface as recited in claim 1, wherein the stalk angle is between approximately 45 degrees and 90 degrees.

3. The wall surface as recited in claim 1, wherein a cross section of the stalk is substantially square shaped, rectangular shaped, circular shaped, elliptically shaped, triangular shaped, hexagonally shaped or multi-sided prism shaped.

4. The wall surface as recited in claim 1, wherein the second side of the tip is substantially square shaped, rectangular shaped, circular shaped, elliptically shaped, triangular shaped, hexagonally shaped or multi-sided prism shaped.

5. The wall surface as recited in claim 1, wherein the stalk and tip form a mushroom shape.

6. The wall surface as recited in claim 1, wherein the wall surface, each stalk and each tip are formed from a single material.

7. The wall surface as recited in claim 1, wherein each stalk and tip are made of a silicone rubber, a polyurethane plastic, a thermoplastic, a thermoset, a UV curable material, a polymer or a combination thereof.

8. The wall surface as recited in claim 1, wherein the each stalk and tip are formed by micro/nano-molding one or more templates.

9. The wall surface as recited in claim 8, wherein the one or more templates are produced using a photolithography process and/or etching process.

10. The wall surface as recited in claim 1, wherein:
  each stalk has a stalk diameter of approximately 50 μm and a length of approximately 100 μm;
  each tip has a tip diameter of approximately 100 μm; and
  a center of each stalk is separated from a center of an adjacent stalk by approximately 120 μm.

11. The wall surface as recited in claim 1, wherein the stalks in the array of spaced-apart individual fibers are arranged in a square packing, a hexagonal packing or a random packing.

12. The wall surface as recited in claim 1, wherein the spaced-apart individual fibers within the array have varying cross-sectional shapes, diameters and/or spacings.

13. The wall surface as recited in claim 1, wherein the array of spaced-apart individual fibers increase a lift of the aerodynamic or hydrodynamic wall surface.

14. The wall surface as recited in claim 1, wherein the array of spaced-apart individual fibers increase a lift-to-drag ratio of the aerodynamic or hydrodynamic wall surface.

15. The wall surface as recited in claim 1, wherein at least a portion of the aerodynamic or hydrodynamic wall surface comprise a curved surface.

16. The wall surface as recited in claim 1, further comprising one or more additional arrays of spaced-apart individual fibers having one or more of a different stalk angle, a different stalk shape, a different stalk length, a different stalk diameter, a different tip angle, a different tip shape, a different tip length, a different tip diameter, a different spacing, a different packing or a different backing layer thickness.

17. A method for reducing a drag of an aerodynamic or hydrodynamic wall surface comprising:
  providing the aerodynamic or hydrodynamic wall surface comprising at least a portion of wind turbine blade, a propeller, a wing, an airfoil, a flight control surface, a hull of a ship or a submarine, a land-based vehicle, an manned or unmanned aerial vehicle, a pipeline or a stationary structure;
  attaching an array of spaced-apart individual fibers to the aerodynamic or hydrodynamic wall surface, wherein each individual fiber comprises a stalk and a tip made of a single moldable material, and each stalk extends outward from the aerodynamic or hydrodynamic wall surface;
  wherein each stalk having a first end and a second end, wherein the first end is attached to the aerodynamic or hydrodynamic wall surface, and the stalk is oriented with respect to the aerodynamic or hydrodynamic wall surface at a stalk angle between approximately 1 degree and 179 degrees, each stalk has a stalk diameter of approximately 10 nm to 1000 μm, and a length of approximately 10 nm to 1000 μm, and a center of each stalk is separated from a center of an adjacent stalk by approximately 10 nm to 5000 μm;
  wherein each tip having a first side and a second side, wherein the first side is attached proximate to the second end of the stalk, the tip has a larger cross-sectional area than the stalk, and the second side comprises a substantially planar surface that is oriented with respect to the stalk at a tip angle between approximately 0 degrees and 90 degrees, and each tip has a tip diameter of approximately 10 nm to 2000 μm; and
  reducing the drag of the aerodynamic or hydrodynamic wall surface by at least 30% using the array of spaced-apart individual fibers.

18. The method as recited in claim 17, further comprising increasing a lift of the aerodynamic or hydrodynamic wall surface using the array of spaced-apart individual fibers.

19. The method as recited in claim 17, further comprising increasing a lift-to-drag ratio of the aerodynamic or hydrodynamic wall surface using the array of spaced-apart individual fibers.

* * * * *